US011099818B2

(12) United States Patent
Bojara et al.

(10) Patent No.: US 11,099,818 B2
(45) Date of Patent: Aug. 24, 2021

(54) APPLICATION PROGRAMMING INTERFACE (API) CREATOR AND DEPLOYMENT TOOL

(71) Applicant: JPMorgan Chase Bank, N.A., New York, NY (US)

(72) Inventors: Jakub Bojara, Bournemouth (GB); Tyrone M. Saunders, Houston, TX (US); Christian Howard Post, Houston, TX (US); Allen G. Siemens, Houston, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/602,834

(22) Filed: Dec. 11, 2019

(65) Prior Publication Data

US 2020/0183659 A1 Jun. 11, 2020

Related U.S. Application Data

(60) Provisional application No. 62/778,116, filed on Dec. 11, 2018.

(51) Int. Cl.
*H04L 29/08* (2006.01)
*H04L 29/06* (2006.01)
(Continued)

(52) U.S. Cl.
CPC .................. *G06F 8/35* (2013.01); *G06F 8/60* (2013.01); *G06F 16/2291* (2019.01);
(Continued)

(58) Field of Classification Search
CPC ...... G06F 9/541; G06F 9/547; G06F 16/2552; G06F 16/2291; G06F 8/30; G06F 8/36;
(Continued)

(56) References Cited

U.S. PATENT DOCUMENTS 10,498,747 B1\* 12/2019 Meaney .................. H04L 63/20
2013/0326470 A1\* 12/2013 Jentsch ..................... G06F 8/35
717/104
(Continued)

OTHER PUBLICATIONS

Liu et al., Refactoring Java Code for Automatic API Generation, 6 pages (Year: 2018).\*

*Primary Examiner* — Thuy Dao
(74) *Attorney, Agent, or Firm* — Greenblum & Bernstein, P.L.C.

(57) ABSTRACT

A method for generating an application programming interface (API) is provided. The method includes: receiving, via a user interface, a first user input; providing, from among a plurality of predetermined templates and in response to the first user input, a first template for the API; uploading the first template to a software development tracker; receiving at least one from among a second user input that relates to the first template and a feedback from the software development tracker; and generating the API based on the second user input and the feedback. The first user input specifies at least one requirement that relates to the API. This input may then be translated into an SQL query and automatically deployed to any of a development environment, a user acceptance testing environment, and a production environment.

18 Claims, 4 Drawing Sheets

(51) Int. Cl.
    *G06F 9/54*      (2006.01)
    *H04L 12/24*     (2006.01)
    *G06F 9/44*      (2018.01)
    *G06F 8/35*      (2018.01)
    *G06F 8/60*      (2018.01)
    *G06N 20/00*     (2019.01)
    *G06F 16/22*     (2019.01)
    *G06F 11/36*     (2006.01)

(52) U.S. Cl.
    CPC ............ *G06N 20/00* (2019.01); *H04L 63/20* (2013.01); *G06F 11/36* (2013.01)

(58) Field of Classification Search
    CPC ..... G06F 8/35; G06F 8/60; G06F 8/20; G06F 8/71; G06F 9/451; G06F 16/9535; G06F 16/951; G06F 9/5072; G06F 9/5077; G06F 9/54; H04L 67/02; H04L 67/10; H04L 67/34; H04L 67/1097; G06Q 10/10
    See application file for complete search history.

(56) References Cited

U.S. PATENT DOCUMENTS

| | | | |
|---|---|---|---|
| 2014/0033170 A1* | 1/2014 | Nimashakavi | G06F 16/972 717/120 |
| 2015/0347119 A1* | 12/2015 | Wang | G06F 8/65 717/120 |
| 2017/0046437 A1* | 2/2017 | Desineni | G06F 16/9535 |
| 2018/0069865 A1* | 3/2018 | Rieke | H04L 43/045 |
| 2018/0246738 A1* | 8/2018 | McCourtney | G06F 9/44589 |
| 2018/0314622 A1* | 11/2018 | Lowe | G06F 9/44526 |
| 2020/0044862 A1* | 2/2020 | Yadlin | H04L 9/30 |

\* cited by examiner

200

APPLICATION PROGRAMMING INTERFACE (API) CREATOR AND DEPLOYMENT TOOL

CROSS-REFERENCE TO RELATED APPLICATION

This application claims the benefit of U.S. Provisional Patent Application Ser. No. 62/778,116, filed Dec. 11, 2018, which is hereby incorporated by reference in its entirety.

BACKGROUND

1. Technical Field

The present disclosure relates to the field of software development. More particularly, the present disclosure relates to a method for generating an application programming interface for facilitating software development and testing.

2. Background

When a software developer begins a process of generating new software for an application, there is a need to create an application programming interface (API) that enables a user to develop the software efficiently and connect with other systems.

Typically, the process of creating and deploying an API requires that the software developer set up a particular environment, create the API, and then manage the deployment process in a manner that satisfies organizational standards and also addresses potential security vulnerabilities. In addition, this process is generally a manual process that is performed separately for each individual software development project. For these reasons, the process may be time-consuming and cumbersome.

Accordingly, there is a need for a simplified methodology for creating an API that facilitates software development.

SUMMARY

The present disclosure, through one or more of its various aspects, embodiments, and/or specific features or sub-components, provides, inter alia, various systems, servers, devices, methods, media, programs, and platforms for generating an application programming interface for facilitating software development and testing. The various aspects, embodiments, features, and/or sub-components provide optimized processes for generating application programming interfaces.

According to an aspect of the present disclosure, a method for generating an application programming interface (API) is provided. The method is implemented by an API generation device that includes a processor and a user interface. The method includes: receiving, via the user interface, a first user input; providing, from among a plurality of predetermined templates and in response to the first user input, a first template for the API; uploading the first template to a software development tracker; receiving at least one from among a second user input that relates to the first template and a feedback from the software development tracker; generating the API based on the first user input, the second user input and the feedback; and deploying the generated API.

The deploying of the generated API may include using at least one from among Jenkins and Jules for deploying the generated API.

The first user input may be translated to a query that specifies at least one requirement that relates to the API. The query may include at least one of a Structured Query Language (SQL) query and a MapReduce query.

The method may further include determining at least one data structure to be used in the generating of the API by matching at least one of the query and columnar data with at least one potential data source.

The method may further include: using a machine learning algorithm to generate metadata that relates to the determined at least one data structure; and updating at least one template from among the plurality of predetermined templates based on the metadata.

The receiving of the first user input may include providing, via the user interface, a menu that includes a plurality of menu items; and receiving a selection of at least one menu item.

The software development tracker may include at least one from among Git, Bitbucket, Jules, and Jenkins.

The feedback may include at least one from among a first feedback type that relates to a code developer, a second feedback type that relates to an output of user acceptance testing, and a third feedback type that relates to a code production.

The feedback may include information stored in a Structured Query Language (SQL) database.

The providing of the first template for the API may include: using a machine learning algorithm to analyze the first user input with respect to the plurality of predetermined templates; and selecting the first template based on an output of the machine learning algorithm.

The generating of the API may include implementing at least one organizational standard in order to ensure that the generated API complies with the at least one organizational standard.

The generating of the API may include implementing at least one cyber security rule in order to protect the generated API from a potential cyber attack.

The generating of the API may include implementing at least one caching rule that includes checking a received query for at least one of a query time, a query bandwidth, and a query record count, and caching the received query based on a result of the checking.

The generating of the API may include setting an access control list in response to a received user system request that enables at least one security protocol.

According to another aspect of the present disclosure, an application programming interface (API) generation device is provided. The API generation device includes a communication interface and a processor. The processor is configured to: receive, via the communication interface, a first user input; provide, from among a plurality of predetermined templates and in response to the first user input, a first template for the API; upload the first template to a software development tracker; receive, via the communication interface, at least one from among a second user input that relates to the first template and a feedback from the software development tracker; generate the API based on the first user input, the second user input and the feedback; and deploy the generated API.

The processor may be further configured to use at least one from among Jenkins and Jules for deploying the generated API.

The processor may be further configured to translate the first user input to a Structured Query Language (SQL) query that specifies at least one requirement that relates to the API.

The processor may be further configured to provide, via the communication interface, a menu that includes a plurality of menu items; and to receive, as the first user input, a selection of at least one menu item.

The software development tracker may include at least one from among Git, Bitbucket, Jules, and Jenkins.

The feedback may include at least one from among a first feedback type that relates to a code developer, a second feedback type that relates to an output of user acceptance testing, and a third feedback type that relates to a code production.

The feedback may include information stored in a Structured Query Language (SQL) database.

The processor may be further configured to: use a machine learning algorithm to analyze the first user input with respect to the plurality of predetermined templates; and select the first template based on an output of the machine learning algorithm.

The processor may be further configured to generate the API by implementing at least one organizational standard in order to ensure that the generated API complies with the at least one organizational standard.

The processor may be further configured to generate the API by implementing at least one cyber security rule in order to protect the generated API from a potential cyber attack

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
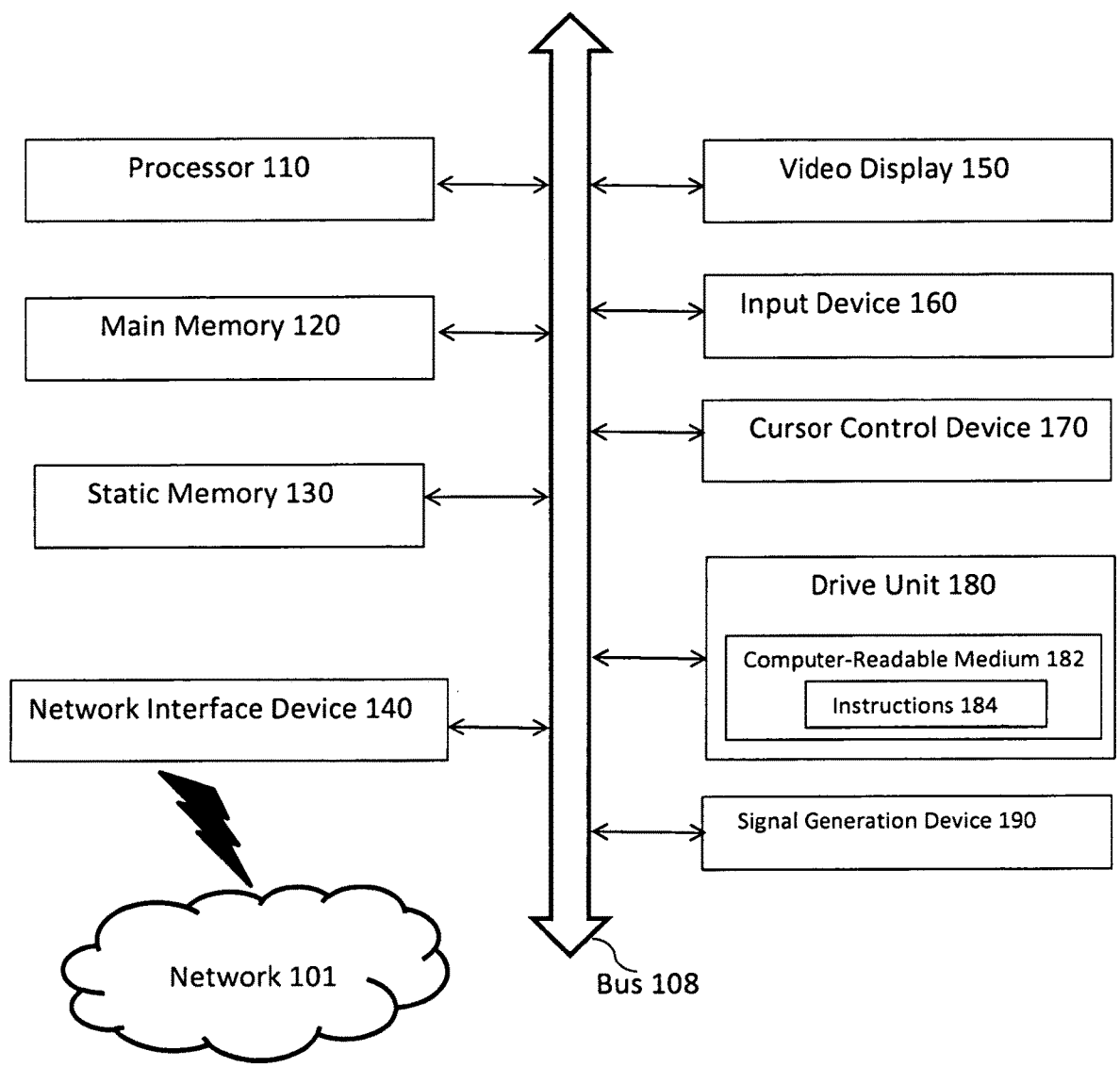
FIG. 1 shows an exemplary general computer system that is configured to implement a method for generating an application programming interface (API), according to an exemplary embodiment.

FIG. 1 is an illustrative embodiment of a general computer system, on which a method for creating and deploying an application programming interface (API) may be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. Further, the computer system 100 may connect or communicate with other computer systems by near field communications, which includes, without limitation, near field communication (NFC), Bluetooth, radio frequency identification (RFID), or other communication technologies that allow direct communication with another computer system or device.

In a networked deployment, the computer system 100 may operate in the capacity of a server, a client user computer, or any computing device having at least a processor and a memory in a server-client user network environment, or as a peer computer system in a peer-to-peer (or distributed) network environment. The computer system 100 may operate in a network environment including an intermediary device for facilitating transactions with other computer systems, or in a peer-to-peer network environment without the intermediary device. The intermediary device may be a remote third party server residing on a network or a third party device that is not directly involved in a transaction between two computer systems or devices.

The computer system 100 can also be implemented as or incorporated into various devices, such as a stationary computing device, a mobile computer, a wearable computer (e.g., smart watch), a computer system in a vehicle, a personal computer (PC), a laptop computer, a tablet computer, a wireless smart phone, a personal digital assistant (PDA), a communications device, a control system, a network router, switch or bridge, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Further, the computer system 100 may access external memory via a network, such as a cloud network.

Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory (e.g., secure digital (SD) non-volatile memory card), electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

As shown, the computer system 100 may further include (or may be connected to) a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. Further, the input device 160 may additionally include a biometric input device, which may capture biometric information of a user. The biometric input device may include, without limitation, a finger print reader, a camera, an iris scanner, a microphone, and any other device that may capture biometric information of the user. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the secondary memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140. The network 101 may be, for example, the Internet.

Figure 2:
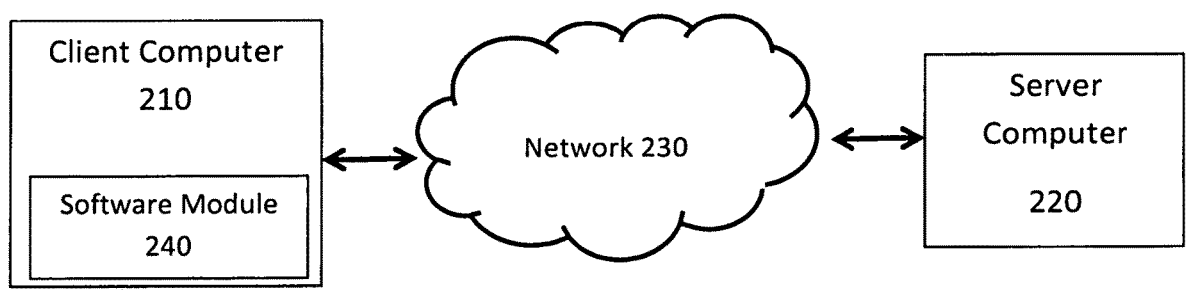
FIG. 2 shows a block diagram of a networked system that includes a client computer that is communicatively connected to at least one server computer via a network, according to an exemplary embodiment.

FIG. 2 is a block diagram of a networked system 200 that includes a client computer 210 that is communicatively connected to at least one server computer 220 via a network 230, according to an exemplary embodiment. Referring to FIG. 2, each of client computer 210 and server computer 220 may be equivalent to computer system 100 as illustrated in FIG. 1. Network 230 may include any type of network that implements a communicative connection between client computer 210 and server computer 220, such as, for example, a local area network (LAN), a wide area network (WAN), or the Internet.

The client computer 210 may include a software module 240 that includes instructions that are executable by the client computer 210 to perform a method for generating an API, in accordance with an exemplary embodiment. Referring also to FIG. 1, the software module 240 may be provided in conjunction with processor 110. Alternatively, the software module 240 may be stored in any one or more of main memory 120, static memory 130, or computer readable medium 182.

Figure 3:
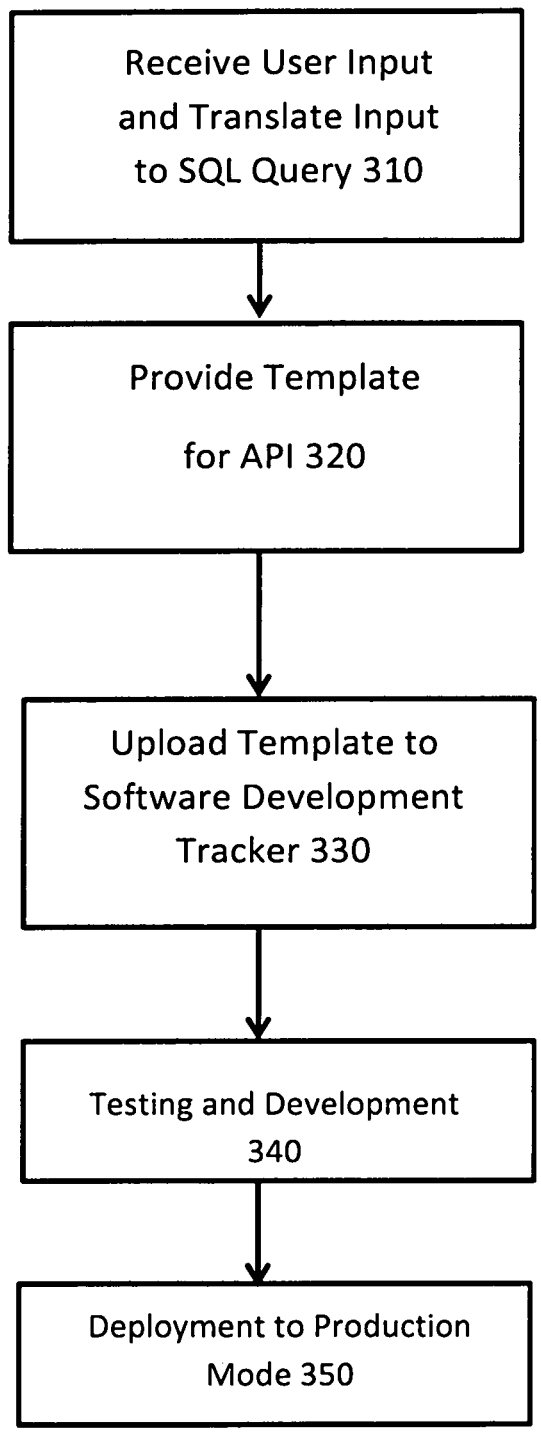
FIG. 3 shows a flowchart that illustrates a method for generating an API, according to an exemplary embodiment.

FIG. 3 is a flowchart 300 that illustrates a method for generating an API, according to an exemplary embodiment. The method may be implemented, for example, as a set of instructions that are executable by a computer to generate an API.

In operation 310, a first user input is received via a user interface. The first user input may include, for example, column names, filters, and/or groupings that specify at least one requirement that relates to the API being created. These requirements are then translated into a query, such as, for example, a Structured Query Language (SQL) query or a MapReduce query. The user interface may provide a drop-down menu that includes several menu items from which a user may indicate selections that then serve as the first user input. The user interface may be displayed, for example, on any one or more of client computer 210 and/or other computers that are communicatively coupled to client computer 210 via network 230. With respect to the query, a user may have an option to specify query statements, which may be analyzed to detect issues that may potentially impact the performance of the API being created.

In operation 320, a first template for the API is provided. The first template may be obtained from among a plurality of predetermined templates that are generated in advance and stored in a database that is accessible by server computer 220 and/or available via an application such as, for example, API Generator. Alternatively, the first template may be "built from scratch", i.e., a user may create a template to be used as the first template for the API.

In operation 330, the first template is uploaded to a software development tracker. The term "software development tracker" refers to a continuous software integration module for tracking software changes, testing, and reporting updates and new versions, such as, for example, Git/Bitbucket.

In operation 340, automated tests are generated and a user may review the API in testing and development environments. In addition, users may make changes to the API and re-deploy the revised version of the API to the testing and development environments. In an exemplary embodiment, this process is fully automated with Jenkins/Jules and Git/Bitbucket. When no further changes are needed and an approval is obtained, the API is then ready for deployment to a production environment.

In an exemplary embodiment, a user may have an option to specify his own SQL for an API. The testing and development environment may include a capability to find potential improvements in the specified SQL in order to increase a performance quality of an API. Previously released APIs may also be scanned to detect performance issues that may have been caused by suboptimal queries. In an exemplary embodiment, artificial intelligence (AI) techniques and/or machine learning techniques may be used to identify these potential improvements.

In an exemplary embodiment, the testing and development environment may include a determination of one or more data structures to be used in the generation of the API. This determination may be implemented by matching at least one of the query and columnar data with at least one potential data source. Further, a machine learning algorithm may be used to generate metadata that relates to the determined data structures, and the generated metadata may then be used to update one or more of the templates to be used for generating new APIs.

The determination of the data structures may result from an application of data principles, such as, for example, Payment Card Industry (PCI) data security standards, that identify proper and/or authoritative data sources. In an exemplary embodiment, the determination of the data structures may further entail implementing a cross-reference rules check to find proximity of appropriate data principles and applicability to received user information.

In an exemplary embodiment, the testing and development environment may further include an implementation of a caching rule that relates to hosting data locally and ensuring good query times with respect to scheduling, triggering, direct invocation, and indirect invocation. The caching rule may include checking received queries to ensure that query times, query bandwidths, and query record counts are optimally balanced.

In an exemplary embodiment, the testing and development environment may further include a setting of an access control list in response to a received user system request that enables one or more security protocols. The access control list may be calculated based on a set of connectors that results from the security protocols.

In operation 350, the API is deployed to the production environment and made available to a general user population.

Figure 4:
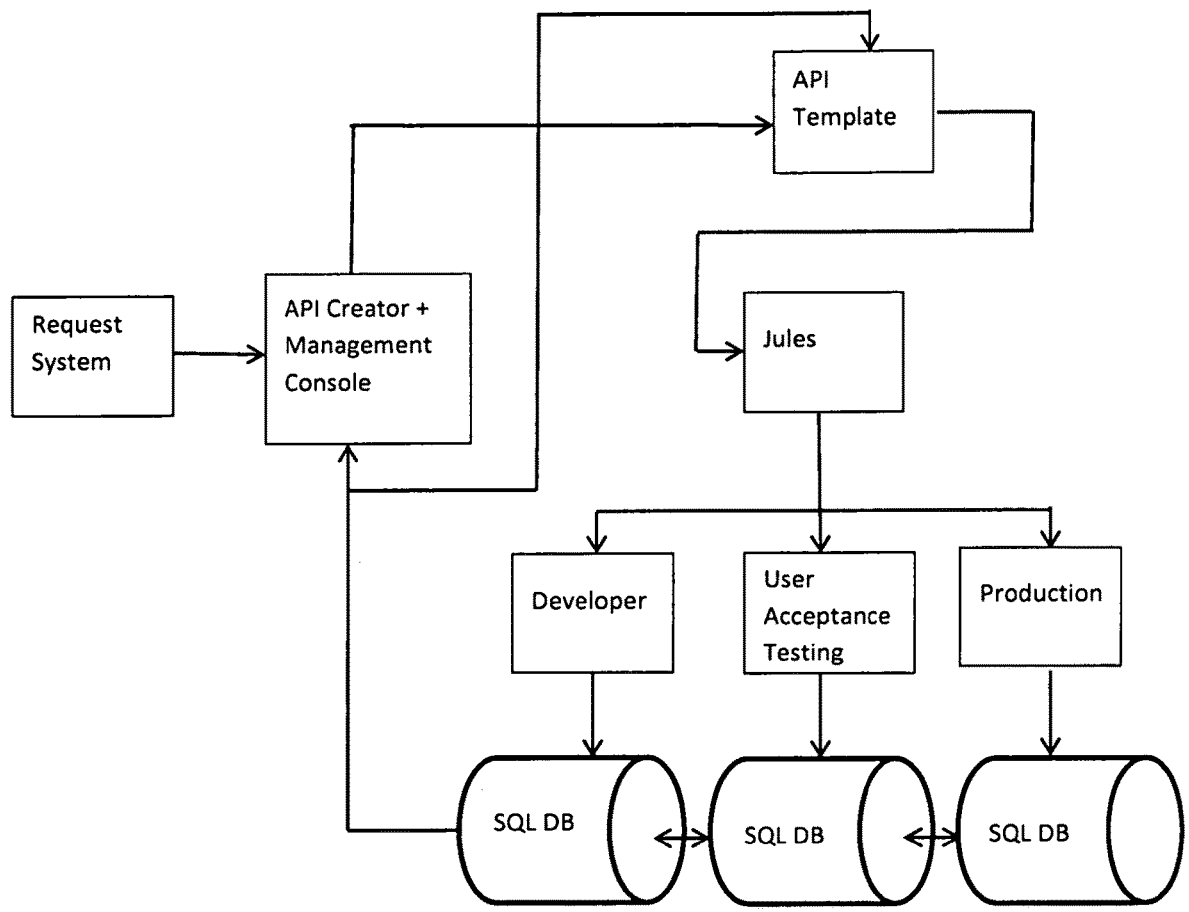
FIG. 4 shows a data flow diagram that illustrates an information flow that is concurrent with a process for creating and managing an API, according to an exemplary embodiment.

FIG. 4 shows a data flow diagram that illustrates an information flow that is concurrent with a process for creating and managing an API, according to an exemplary embodiment. In particular, at the left side of FIG. 4, a request is received, and the request is routed to an API Creator+Management Console, and from there the request is forwarded to an API Template repository. A template is selected from among a pre-generated set of templates by the API Template repository, and the selected template is then routed to the API Creator, which may generate code based on the template. Code is then published to Bitbucket and Jenkins/Jules for deployment. The template and any additional feedback input generated by Jules are then forwarded to three different destinations: a developer node, a user acceptance testing (UAT) node, and a production node. Each of these nodes has access to an SQL database, and may also provide additional input. The result is then forwarded back to the API Creator+Management Console, which is configured to generate an API based on these inputs. In the event that further user input is provided at the initial request node, that input may be processed such that the API is subsequently updated based on the result of the further processing.

In an exemplary embodiment, as more users utilize the methodologies illustrated in FIGS. 3 and 4, a priority of options may be generated based on user feedback, organizational relationships, and whether prior situational recommendations have been successful. In this aspect, data inputs and outputs may be clustered, and the clustered data may be used to provide feedback results in order to improve future generations of APIs.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As described above, according to an aspect of the present disclosure, a system and method is provided for generating a user interface for facilitating a user capability to access and execute an application, such that the user interface includes user-selected features in accordance with a preferred aesthetic design.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person ordinarily skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating an application programming interface (API), comprising:

receiving, via a user interface, a first user input;
providing, from among a plurality of predetermined templates and in response to the first user input, a first template for the API;
uploading the first template to a software development tracker;
receiving at least one from among a second user input that relates to the first template and a feedback from the software development tracker;
generating the API based on the first user input, the second user input and the feedback; and
deploying the generated API,
wherein the first user input is translated to a query that specifies at least one requirement that relates to the API, the query including at least one from among a Structured Query Language (SQL) query and a MapReduce query.

2. The method of claim 1, wherein the deploying the generated API comprises using at least one from among Jenkins and Jules for deploying the generated API.

3. The method of claim 1, further comprising determining at least one data structure to be used in the generating of the API by matching at least one of the query and columnar data with at least one potential data source.

4. The method of claim 3, further comprising:
using a machine learning algorithm to generate metadata that relates to the determined at least one data structure; and
updating at least one template from among the plurality of predetermined templates based on the metadata.

5. The method of claim 1, wherein the receiving the first user input comprises providing, via the user interface, a menu that includes a plurality of menu items; and receiving a selection of at least one menu item.

6. The method of claim 1, wherein the software development tracker includes at least one from among Git, Bitbucket, Jules, and Jenkins.

7. The method of claim 1, wherein the feedback includes at least one from among a first feedback type that relates to a code developer, a second feedback type that relates to an output of user acceptance testing, and a third feedback type that relates to a code production.

8. The method of claim 7, wherein the feedback includes information stored in a Structured Query Language (SQL) database.

9. The method of claim 1, wherein the providing the first template for the API comprises:
using a machine learning algorithm to analyze the first user input with respect to the plurality of predetermined templates; and
selecting the first template based on an output of the machine learning algorithm.

10. The method of claim 1, wherein the generating the API comprises implementing at least one organizational standard in order to ensure that the generated API complies with the at least one organizational standard.

11. The method of claim 1, wherein the generating the API comprises implementing at least one cyber security rule in order to protect the generated API from a potential cyber attack.

12. The method of claim 1, wherein the generating the API comprises implementing at least one caching rule that includes checking a received query for at least one of a query time, a query bandwidth, and a query record count, and caching the received query based on a result of the checking.

13. The method of claim 1, wherein the generating the API comprises setting an access control list in response to a received user system request that enables at least one security protocol.

14. An application programming interface (API) generation device, comprising:
   a communication interface; and
   a hardware processor,
   wherein the processor is configured to:
      receive, via the communication interface, a first user input;
      provide, from among a plurality of predetermined templates and in response to the first user input, a first template for the API;
      upload the first template to a software development tracker;
      receive, via the communication interface, at least one from among a second user input that relates to the first template and a feedback from the software development tracker;
      generate the API based on the first user input, the second user input and the feedback; and
      deploy the generated API,
   wherein the processor is further configured to translate the first user input to a query that specifies at least one requirement that relates to the API, the query including at least one from among a Structured Query Language (SQL) query and a MapReduce query.

15. The API generation device of claim 14, wherein the processor is further configured to provide, via the communication interface, a menu that includes a plurality of menu items; and to receive, as the first user input, a selection of at least one menu item.

16. The API generation device of claim 14, wherein the feedback includes at least one from among a first feedback type that relates to a code developer, a second feedback type that relates to an output of user acceptance testing, and a third feedback type that relates to a code production.

17. The API generation device of claim 14, wherein the feedback includes information stored in a Structured Query Language (SQL) database.

18. The API generation device of claim 14, wherein the processor is further configured to:
   use a machine learning algorithm to analyze the first user input with respect to the plurality of predetermined templates; and
   select the first template based on an output of the machine learning algorithm.

\* \* \* \* \*